(12) United States Patent
Link

(10) Patent No.: US 6,571,568 B1
(45) Date of Patent: Jun. 3, 2003

(54) PORTABLE AIR CONDITIONING APPARATUS

(76) Inventor: John Link, 25 Park Way, Upper Saddle River, NJ (US) 07458

( * ) Notice: Subject to any disclaimer, the term of this patent is extended or adjusted under 35 U.S.C. 154(b) by 0 days.

(21) Appl. No.: 10/267,395

(22) Filed: Oct. 9, 2002

Related U.S. Application Data
(60) Provisional application No. 60/369,028, filed on Apr. 1, 2002.

(51) Int. Cl.[7] ................................................. B60H 1/32
(52) U.S. Cl. ........................... 62/244; 62/421; 62/425; 62/464; 62/457.1
(58) Field of Search .................... 62/244, 420, 421, 62/425, 457.1, 457.2, 457.7, 457.9, 464

(56) References Cited

U.S. PATENT DOCUMENTS

| | | | |
|---|---|---|---|
| 1,972,231 A | | 9/1934 | Maim et al. |
| 2,207,956 A | | 7/1940 | Timms et al. |
| 4,823,554 A | * | 4/1989 | Trachtenberg et al. ........ 62/244 |
| 4,936,103 A | * | 6/1990 | Newman ..................... 62/244 |
| 5,062,281 A | | 11/1991 | Oliphant et al. |
| 5,083,444 A | * | 1/1992 | Eming ......................... 62/464 |
| 5,159,819 A | | 11/1992 | Wong |
| 5,197,301 A | * | 3/1993 | Holcomb ................... 62/457.1 |
| 5,317,883 A | * | 6/1994 | Newman ................... 62/457.1 |
| 5,369,964 A | | 12/1994 | Mauer et al. |
| 5,653,122 A | * | 8/1997 | Anders et al. ............ 62/457.1 |
| 5,661,978 A | * | 9/1997 | Holmes et al. ........... 62/457.1 |
| 5,685,165 A | | 11/1997 | Bigelow, Jr. |
| 5,709,104 A | | 1/1998 | Howcroft |
| 5,762,129 A | | 6/1998 | Elliott |
| 5,941,077 A | * | 8/1999 | Safyan ....................... 62/457.9 |
| 6,026,653 A | | 2/2000 | Presnell |
| 6,269,651 B1 | | 8/2001 | Price |
| 6,354,104 B1 | * | 3/2002 | Feagin ....................... 62/457.1 |
| 6,467,779 B1 | * | 10/2002 | Mills ....................... 280/47.26 |
| 6,474,097 B2 | * | 11/2002 | Treppedi et al. ........... 62/457.7 |

* cited by examiner

Primary Examiner—William E. Tapolcai
Assistant Examiner—Mohammad M. Ali
(74) Attorney, Agent, or Firm—Barry G. Magidoff; Paul J. Sutton

(57) ABSTRACT

A portable cooling or heating system suitable for use on vehicle such as a car, plane or boat, that does not have its own air conditioning system. The system is intended to be combined with a portable cooler chest and includes an electric fan unit that can be powered from the power supply on a vehicle. The cooling is provided by ice and the like. The system can also be used to heat a confined space by placing a hot material in the chest.

9 Claims, 3 Drawing Sheets

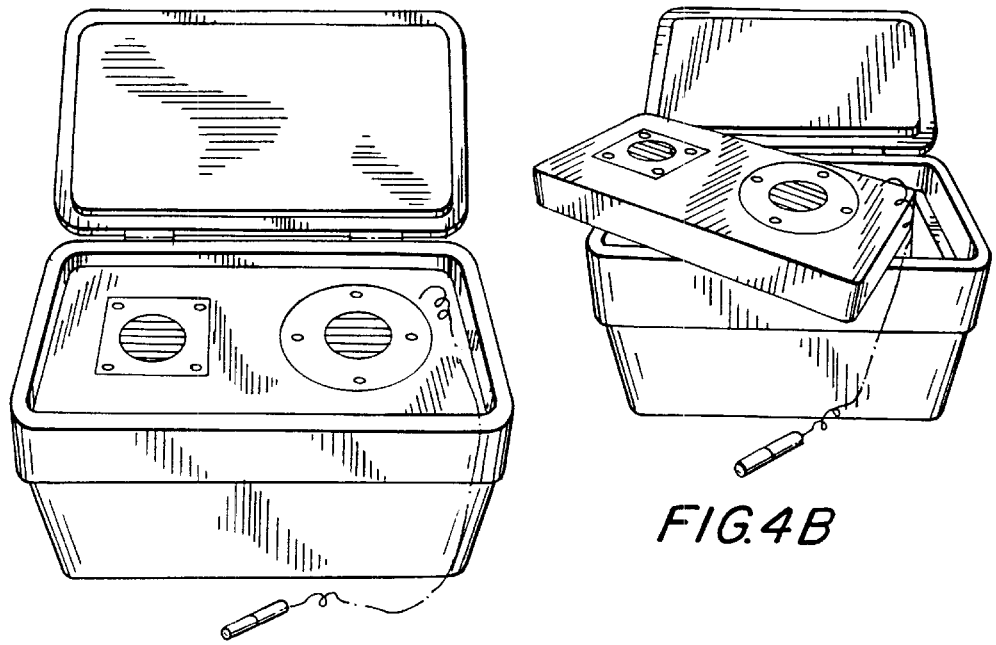
FIG.4A
FIG.4B
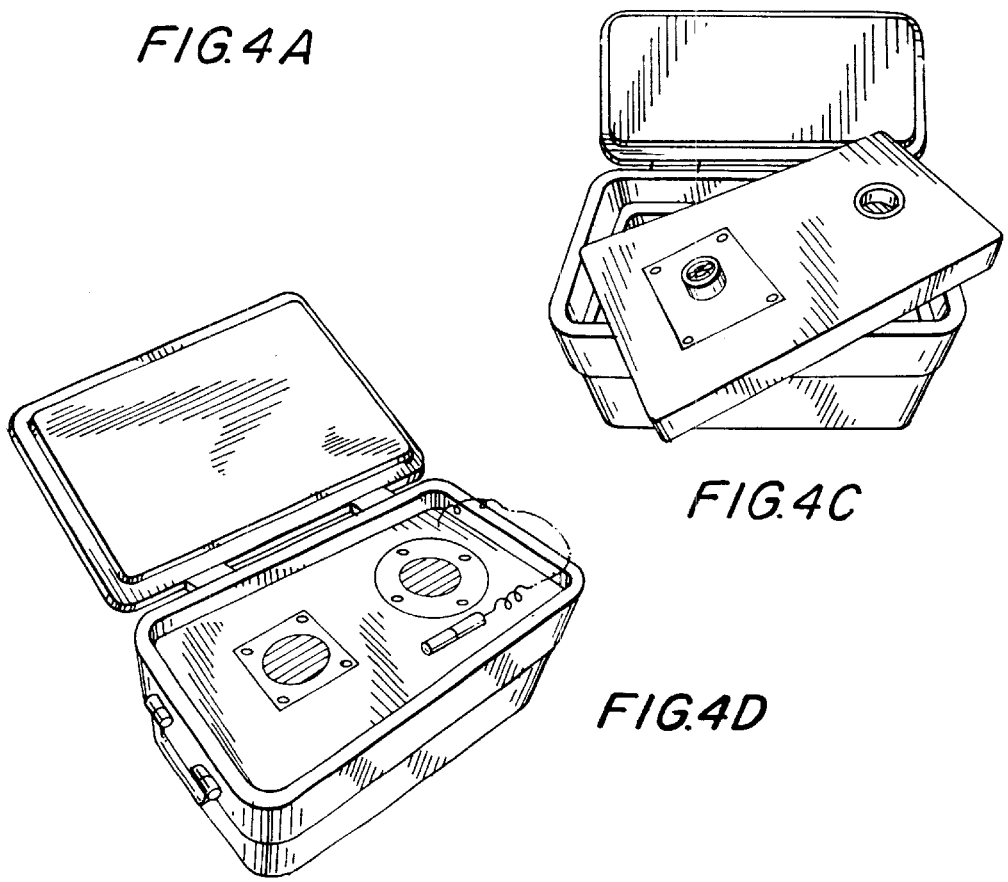
FIG.4C
FIG.4D

PORTABLE AIR CONDITIONING APPARATUS

This application claims the benefit of Provisional Application No. 60/369,028, filed Apr. 1, 2002.

FIELD OF THE INVENTION

The present invention is directed to a portable cooling or heating system suitable for use on vehicle such as a car, plane or boat, that does not have its own air conditioning system.

BACKGROUND OF THE INVENTION

A variety of vehicles, typically smaller cars, airplanes, and boats, do not have their own cooling/heating system. In hot or cold weather these vehicles can be very uncomfortable. The addition of an add-on air conditioning system to a vehicle is a complex and expensive undertaking. With respect to certain airplanes, it is very difficult to install an add-on system because of available engine power, and certain FAA regulations severely restrict such add-ons. Adding a typical commercially available air conditioning system with either an electrical compressor or a belt driven compressor is not feasible for many vehicles. Electrical compressors typically require 50 to 100 amps of power or more—which exceed the available power in many vehicles. A belt driven unit requires a significant amount of horse power which is not available in many vehicles. Thus, there has long been a need for a portable cooling/heating system for vehicles without such a system.

One such cooling system is disclosed in U.S. Pat. No. 5,685,165 (Bigelow). This air-conditioning system included a fan with a radiator that sits on top of an open ice chest. A pump pumps a heat exchange fluid typically water taken from an ice-water mixture contained in the ice-chest, through a hose into the radiator, from which the fluid flows back into the ice chest. A single housing enclosed the radiator and fan, and is attached to a collapsible frame which enables a user to position and angle the fan above the open ice chest. The fan pulls air through a back end of the radiator, which cools the air, and then blows the cooled air out through a front end of the radiator. In an alternative embodiment, the fan's housing and frame rest on top of a closed ice chest, and the hose through which the heat exchange fluid flows enters the ice chest through openings drilled in the lid of the ice chest. The power requirements of this air-conditioning unit are rather substantial for a vehicle battery, since power is needed for both the fan and the pump.

Another cooling system is disclosed in U.S. Pat. No. 5,062,281 (Oliphant, et al.). The cooling system of this device is intended to be used with an 8 to 32 ounce cup of ice water or some other appropriate fluid. The cooling unit is dimensioned to fit into the top of a cup, and contains two small batteries, typically C-size batteries, an intake fan with an on/off switch, and an air exit opening. When on, the fan pulls air in through an intake opening into contact with the fluid mixture in the cup. The fluid mixture can be either hot or cold, depending upon whether the device is to be used for cooling or heating. The air, either cooled or heated, then exits through a spout shaped air exit opening. This device is useful for an individual to cool or warm oneself, but is insufficient for cooling or heating a cabin of a vehicle, such as a boat or airplane.

Thus, there has long been a need for such a system which is small enough so that it does not occupy an inordinate amount of space, yet is efficient enough to heat or cool the vehicle so its passengers are comfortable, and not place undue demands on the vehicles' electrical power supply system. There is also need for a portable air-conditioning system that utilizes a portable ice chest without compromising its primary function of cooling food and beverages.

SUMMARY OF THE INVENTION

One embodiment of the present invention includes a cooling unit sized to fit inside a commercially available, insulated ice chest. Many such ice chests have a ridge on the inside of the chest upon which the cooling unit of the invention can rest. The cooling unit itself includes a fan to draw air from outside into the ice chest, and an exhaust vent by which air can exit the ice chest. The fan on the cooling unit can have an electrical connection for connection to an electrical power supply. When the ice chest is filled with ice, the air drawn into the chest by the fan and vented through the exhaust vent is cooled by movement through the ice. The cooling unit can optionally include an air directional wall that extends vertically downward from the cooling unit into the chest to force air into contact with the ice. In a second embodiment of the invention, the ice chest itself is modified, so that the air intake motor assembly is mounted in one side wall of the ice chest, and the air exhaust vent is mounted in a wall opposite of the wall with the motor assembly.

Similarly, the ice chest can be filled with hot water to heat the air being drawn into the chest, so that the device of the present invention can serve as a heating unit.

In all embodiments, the ice chest can also be used to store food and beverages.

BRIEF DESCRIPTION OF THE DRAWINGS

FIGS. 4a to 4d present four photographs of a preferred embodiment of the portable cooling system of the present invention.

DETAILED DESCRIPTION OF THE INVENTION

Figure 1A:
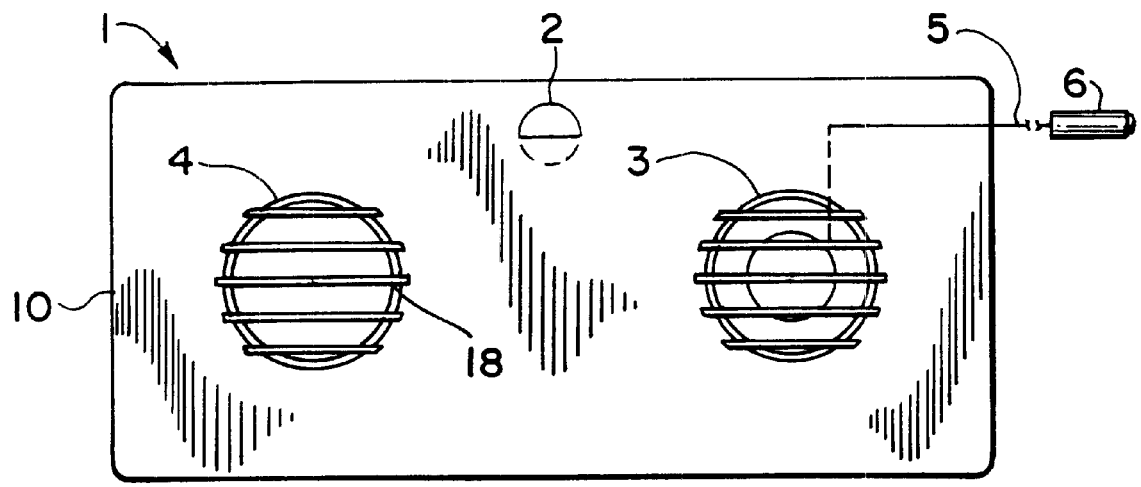
FIG. 1a is a top view of the portable cooling apparatus of the present invention.
Figure 1B:
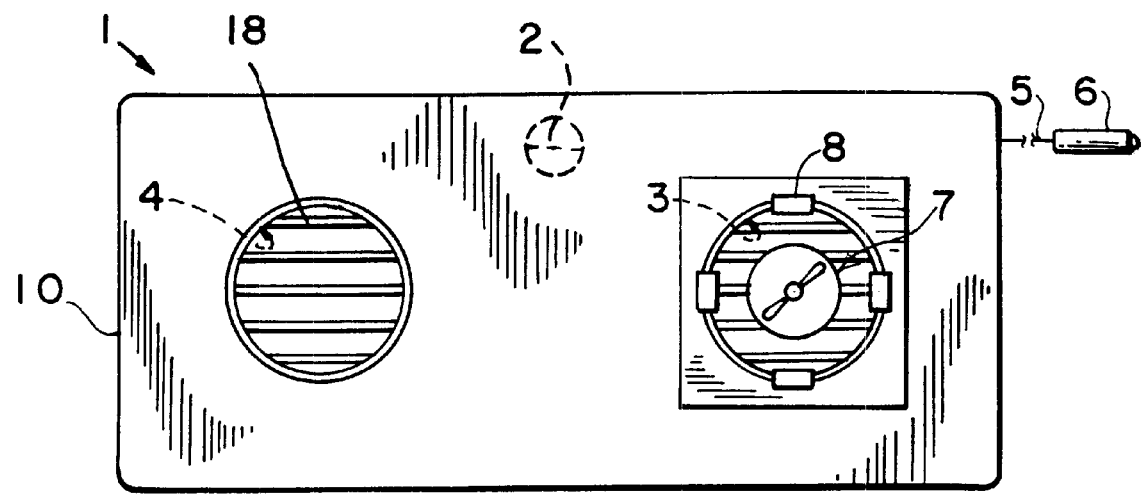
FIG. 1b is a bottom view of the portable cooling apparatus of the present invention.

A top view of the cooling unit of the present invention is depicted in FIG. 1a, and a bottom view of the cooling housing 10 is shown in FIG. 1b. The cooling unit 1 includes a housing 10 sized generally to fit in the top of a commercially available ice chest. One such ice chest model is available from Igloo Products of Houston, Tex. The housing includes a molded, recessed pull handle 2, an opening 3 for the placement of an electric motor and fan unit 7, and an opening 4 for an air exhaust vent. In one embodiment, the motor and fan unit 7 is attached to housing 10 by a plurality of spring clips 8. Alternatively, the motor and fan unit 7 can be screw mounted to the housing 10, as shown in FIG. 4. Attached to the housing is a power cord 5 that connects to the motor unit. In one preferred embodiment, the unattached end of power cord 5 includes a cigarette plug 6 for connecting to a vehicle's cigarette lighter to form a 12 VDC connection for providing power to the motor unit. This enables the motor and fan unit 7 to be powered by a vehicle's battery.

Figure 2:
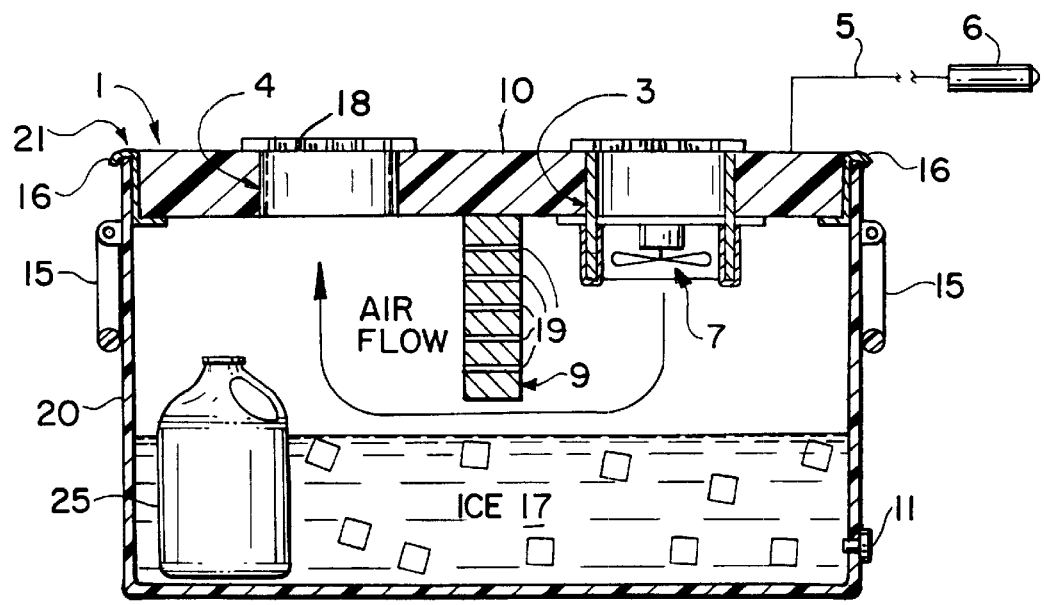
FIG. 2 is a cutaway side view of the portable cooling apparatus of the present invention.

A cutaway side view of the cooling unit of the invention is depicted in FIG. 2. An ice chest 20 is shown with an opening 21 at a top end of the chest 20. Ice chest 20 includes handles 15, a drain plug 11, and is at least partially filled with ice 17. The ice 17 can be partially melted or otherwise mixed with water. Cooling unit 1 is shown placed in the opening 21 of ice chest 20. If the inside of the ice chest 20 is lacking a ridge on the inside near the opening 21, a set of hooks 16 can be provided that hook onto the top end of ice chest 20 and which provide a resting place onto which the housing 10 of cooling unit 1 can be rested. A beverage container 25 is shown to illustrate that the ice chest's primary function of cooling food and beverages is compatible with the addition of the cooling unit 10.

In operation, the motor and fan unit 7 pulls air from the outside through opening 3, and blows the air into and through the ice 17 contained inside the ice chest 20. Coming into contact with the ice 17 cools the air. The cooled air then exits the ice chest 20 through the exhaust vent 4. Placed inside exhaust vent 4 can be a set of louvers 18 that are rotatable about an axis of the opening 4, and are also tiltable, so as to control the direction of the air being exhausted from the ice chest 20. The flow of the air through the ice chest is indicated by the arrow in the figure. The cooling unit 1 can also optionally include an air directional wall 9 to force air into contact with the ice 17. The air directional wall 9 can include a plurality of holes in the event the ice chest 20 is overfilled with ice, thus otherwise blocking the air flow.

Figure 3:
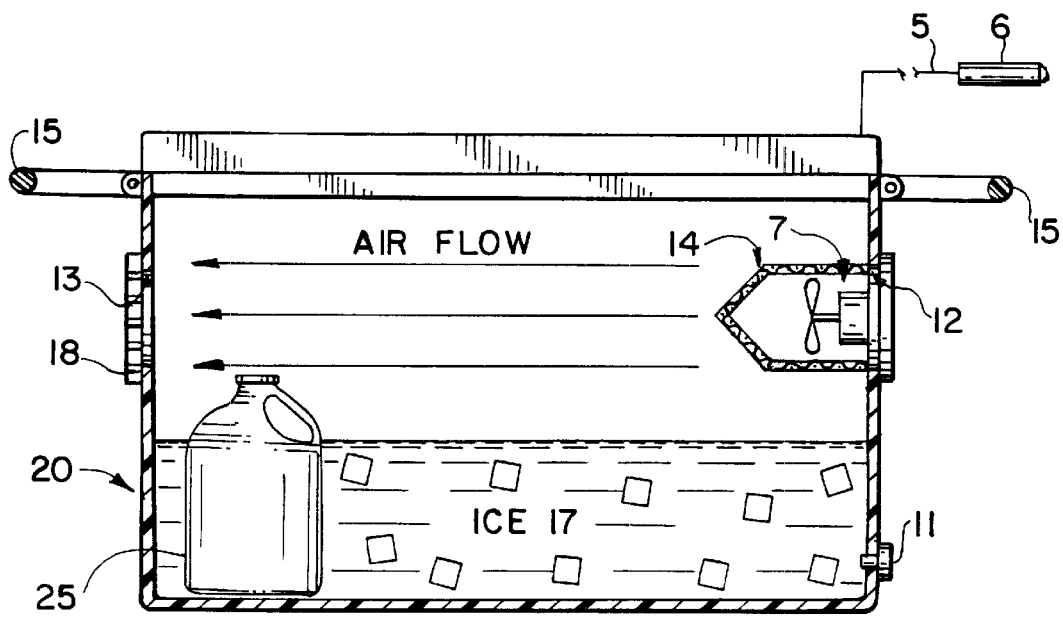
FIG. 3 is a cutaway side view of an alternative embodiment of the cooling apparatus of the present invention.

An alternative embodiment of the cooling system of the invention is depicted in FIG. 3 In this embodiment, the ice chest 20 is itself modified with the addition of a first side opening 12 for the placement of the motor and fan unit 7, and a second side opening 13 for the exhaust vent 18. The motor and fan unit 7 is in this embodiment protected by a mesh screen 14. In operation, the motor and fan unit pulls air in from the outside through the first opening 12, blows the air across and through the ice as indicated by the arrows, so the cooled air exits through the exhaust vent 18. As with the first embodiment, the exhaust vent can include a set of louvers that are rotatable about an axis of the second opening 13, and are also tiltable, so as to control the direction of the air being exhausted from the ice chest 20. A beverage container 25 is shown to illustrate that the ice chest's primary function of cooling food and beverages is compatible with the addition of the cooling unit 10.

FIGS. 4a to 4d depict four photographic images of the cooling unit 1 of the invention inside and on top of an ice chest 20. FIG. 4a depicts a front view of an open ice chest with the cooling unit of the invention pleaded in the top opening of the ice chest. Note that in this embodiment, the motor and fan unit and the air exhaust vent are attached to the housing by means of screws. FIG. 4b depicts a side view of the cooling unit of the present invention, here shown removed from the inside of the ice chest resting on top of same. The ridge on the inside of the ice chest upon which the cooling unit rests is visible in the right hand side of the image. The thickness of the housing is dimensioned so that the unit does not protrude above the top of the ice chest while resting upon the ridge. FIG. 4c depicts the underside of the housing of a cooling unit resting on top of the ice chest. The fan blades of the motor and fan unit are visible in the left side of the image. Finally, FIG. 4d depicts a top view of the housing of the cooling unit, here placed inside the ice chest and resting on the inside ridge.

It should be noted that the air conditioning apparatus of the invention can also function as a heating unit if the ice chest is filled with a hot liquid, instead of a cool liquid such as an ice water mixture.

While the invention has been particularly shown and described with reference to preferred embodiments thereof, it will be understood by those skilled in the art that the foregoing and other changes in form and details may be made therein without departing from the spirit and scope of the invention.

The following is claimed:

1. A portable cooling or heating system suitable for use on a vehicle, the portable system comprising a plate dimensioned to fit on a ledge surrounding the space within a predetermined sized portable cooler chest and to extend across the entire space, the plate having two openings therethrough; the first opening being a vent for the passage of air; an electric motor and fan unit connected into and extending inwardly through the second opening, the unit being disposed to extend into the space within the predetermined cooler chest; and means for providing electrical power to the electric motor; wherein when the plate is supported within the cooler chest space and a cold material is placed in the chest, air forced into the chest by the fan unit is cooled and when vented through the first opening, can serve to cool a vehicle.

2. The portable system of claim 1 comprising a vent grill, covering the first opening, for the passage of air without permitting large particles to pass through the opening.

3. The portable system of claim 2, wherein the grill comprises a set of louvers that are rotatable about an axis of the opening.

4. The portable system of claim 3, wherein the set of louvers are also tiltable.

5. The portable system of claim 1 wherein the system is designed such that when resting upon the ledge within a predetermined size portable cooler, the electric motor and fan unit is disposed to extend into the predetermined cooler chest and to not extend above the top of the cooler chest.

6. The portable system of claim 1 comprising a baffle secured to the plate and located intermediate the two openings, disposed to extend inwardly into the predetermined cooler chest.

7. The portable system of claim 6, wherein the baffle has openings to permit the passage of air therethrough when air cannot pass around the end of the baffle.

8. The portable system of claim 1, wherein the means for providing electrical power to the electric motor comprises a power cord having a plug suitable to electrically connect to the power supply of a vehicle.

9. A portable cooling or heating system suitable for use on a vehicle, the portable system comprising a plate dimensioned to fit on a ledge surrounding the space within a predetermined sized portable cooler chest and to extend across the entire space, the plate having two openings therethrough; a vent grill, for the passage of air without permitting large particles to pass through, covering one of the openings; an electric motor and fan unit connected into and extending inwardly through the second opening, the unit being disposed to extend into the space within the predetermined cooler chest and to not extend above the top of the cooler chest; means for providing electrical power to the electric motor; a baffle secured to the plate and disposed to extend inwardly into the space within the predetermined cooler chest and located intermediate the two openings; wherein when the system is resting on the cooler chest ledge, and a cold material is placed in the chest, air forced into the chest by the fan unit is cooled and when vented through the grill can serve to cool a vehicle.

\* \* \* \* \*